(12) United States Patent
Kumai et al.

(10) Patent No.: US 6,283,478 B1
(45) Date of Patent: Sep. 4, 2001

(54) PISTON RING STRUCTURAL BODY AND METHOD OF MOUNTING THE PISTON RING STRUCTURAL BODY

(75) Inventors: Teruo Kumai, Aichi; Michio Okamoto, Nagano, both of (JP)

(73) Assignees: Toyota Jidosha Kabushiki Kaisha, Toyota; Teikoku Piston Ring Co., Ltd., Tokyo, both of (JP)

( * ) Notice: Subject to any disclaimer, the term of this patent is extended or adjusted under 35 U.S.C. 154(b) by 0 days.

(21) Appl. No.: 09/244,849

(22) Filed: Feb. 4, 1999

(30) Foreign Application Priority Data

Feb. 20, 1998 (JP) .................................................. 10-039226

(51) Int. Cl.[7] ...................................................... F16J 9/16
(52) U.S. Cl. ......................... 277/435; 277/448; 277/460; 29/888.07
(58) Field of Search .................................. 277/435, 442, 277/443, 448, 460; 29/888.07

(56) References Cited

U.S. PATENT DOCUMENTS

| | | | |
|---|---|---|---|
| 3,806,137 | 4/1974 | Prasse et al. | 277/205 |
| 5,156,410 | * 10/1992 | Hom et al. | 277/175 |
| 5,303,465 | 4/1994 | Fujimoto et al. | 29/791 |
| 5,743,536 | * 4/1998 | Komuro et al. | |
| 5,775,201 | * 7/1998 | Tanji et al. | 92/85 R |

FOREIGN PATENT DOCUMENTS

| | | |
|---|---|---|
| 3325015 | 8/1984 | (DE) . |
| 0396775 | 11/1990 | (EP) . |
| 1368597 | 10/1974 | (GB) . |
| 61-136060 | 6/1961 | (JP) . |
| 57-148036 | 9/1982 | (JP) . |
| 8-226542 | 9/1996 | (JP) . |
| 9-280373 | 10/1997 | (JP) . |

* cited by examiner

Primary Examiner—Chuck Y. Mah
Assistant Examiner—Enoch E. Peavey
(74) Attorney, Agent, or Firm—Pillsbury Winthrop LLP

(57) ABSTRACT

The present invention provides a piston ring structural body composed of an outer ring continuously formed of a resinous material, an inner ring continuously formed of a resinous material and a ring tensile force applying member for pressing the outer ring radially outwards via the inner ring. The piston ring structural body has a construction wherein the outer ring continuously formed of polyimide is pressed outwards in the radial direction of the piston by a coil expander via the inner ring continuously formed of PTFE. A sliding face of the outer ring, which slides on a cylinder wall, is divided into upper and lower sliding faces, whose respective upper edge portions are provided with chamfers. A contact portion of the inner ring that contacts the coil expander is provided with an upper inclined face extending inwards and upwards and a lower inclined face extending inwards and downwards. The angles of inclination of the upper and lower inclined faces range from 30° to 60°.

14 Claims, 4 Drawing Sheets

PISTON RING STRUCTURAL BODY AND METHOD OF MOUNTING THE PISTON RING STRUCTURAL BODY

The disclosure of Japanese Patent Application No. HEI 10-39226 filed on Feb. 20, 1998 including the specification, drawings and abstract is incorporated herein by reference in its entirety.

BACKGROUND OF THE INVENTION

1. Field of the Invention

The present invention relates to a piston ring structural body for an internal combustion engine and, more particularly, relates to a piston ring structural body wherein an outer ring continuously formed of a resinous material without being provided with an abutment is pressed radially outwards by a ring tensile force applying member via an inner ring continuously formed of a resinous material without being provided with an abutment. The present invention also relates to a method of mounting the piston ring structural body.

2. Description of the Related Art

Japanese Patent Application Laid-Open No. HEI 9-280373 discloses that a resinous piston ring continuously formed without being provided with an abutment is used to reduce the amount of blow-by gas (gas which leak to a crank case through a gap between a piston ring and a cylinder). In this publication, there is disclosed a piston ring structural body wherein an outer ring continuously formed of polytetrafluoroethylene (PTFE) as a fluororesin without being provided with an abutment is pressed radially outwards by a ring tensile force applying member composed of a metal coil expander via an inner ring also continuously formed of PTFE without being provided with an abutment.

In the piston ring structural body disclosed in the aforementioned publication, the ring is divided into the inner and outer rings. While the inner ring ensures sealability around a ring groove, the outer ring ensures sealability between a sliding portion thereof and a cylinder wall.

It is to be noted herein that the piston ring structural body disclosed in the aforementioned publication uses PTFE for both the inner and outer rings. However, PTFE has a low threshold value of PV (the product of a real pressure P and sliding speed V) and cannot provide the sliding portion that slides on the cylinder wall with sufficient durability. Furthermore, PTFE has a large coefficient of thermal expansion. Thus, when the temperature rises, the pressing force applied to the cylinder wall due to a tensile force of the coil expander becomes larger, which causes a problem of an increase in frictional loss of the engine.

SUMMARY OF THE INVENTION

In view of the aforementioned problem, it is an object of the present invention to enhance durability of a piston ring structural body of a type wherein an outer ring continuously formed of a resinous material without being provided with an abutment is pressed radially outwards by a ring tensile force applying member via an inner ring continuously formed of a resinous material without being provided with an abutment.

It is also an object of the present invention to provide a method of mounting such a piston ring structural body to a piston easily and reliably.

A first aspect of the present invention provides a piston ring structural body fitted into a ring groove of a piston. This piston ring structural body includes an outer ring continuously formed of a first resinous material without being provided with an abutment, an inner ring continuously formed of a second resinous material without being provided with an abutment, and a ring tensile force applying member for pressing the outer ring outwards in a radial direction of the piston via the inner ring. In this piston ring structural body, the first resinous material has a coefficient of thermal expansion and a breaking point that are lower than those of the second resinous material.

In the thus-constructed piston ring structural body, because the inner ring is more susceptible to deformation at a high temperature, the sealability around the ring groove is ensured and the coil expander can suitably apply a tensile force to the outer ring. The outer ring is unlikely to be deformed even at a high temperature, so that the outer ring smoothly slides on the cylinder wall surface without causing any damage to the sealability between itself and the cylinder wall surface.

In the first aspect of the present invention, the ring tensile force applying member may be a coil expander, which is a member composed of a metal wire wound like a coil.

Furthermore, in the first aspect of the present invention, the first resinous material may be polyimide and the second resinous material may be polytetrafluoroethylene.

In the thus-constructed piston ring structural body, the outer ring is made of polyimide and the inner ring is made of polytetrafluoroethylene (PTFE). Because the inner ring is more susceptible to deformation at a high temperature, the sealability around the ring groove is ensured and the coil expander can suitably apply a tensile force to the outer ring. The outer ring is unlikely to be deformed even at a high temperature, so that the outer ring smoothly slides on the cylinder wall surface without causing any damage to the sealability between itself and the cylinder wall surface.

Furthermore, in the first aspect of the present invention, at least a lower face of the outer ring may be coated with titanium nitride, chrome nitride or diamond-like carbon.

Thus, the lower face of the outer ring of the piston ring structural body, which has a construction wherein the outer ring continuously formed of polyimide without being provided with an abutment is pressed outwards in the radial direction of the piston by the coil expander via the inner ring continuously formed of PTFE without being provided with an abutment, is reinforced by being coated with titanium nitride (TiN), chrome nitride (CrN) or diamond-like carbon (DLC). Accordingly, the lower face of the outer ring is inhibited from being abraded despite contact with the ring groove, which occurs in accordance with the movement of the piston in the piston-axis direction.

In addition, the piston ring structural body according to the first aspect of the present invention can be used as a second ring fitted into a ring groove that is located at the second closest position to a top portion of the piston.

In addition, in the first aspect of the present invention, an outside sliding face of the outer ring that is in sliding contact with the cylinder wall may be divided in the top-to-bottom direction, and at least an upper edge of an uppermost sliding face may be provided with a chamfer.

Thus, the sliding face of the outer ring of the piston ring structural body, which has a construction wherein the outer ring continuously formed of polyimide without being provided with an abutment is pressed outwards in the radial direction of the piston by the coil expander via the inner ring continuously formed of PTFE without being provided with an abutment, slides on the cylinder wall and is divided in the top-to-bottom direction. Thereby, the entire cross-section of the outer ring is prevented from being displaced, and the outer ring is inhibited from changing its posture relative to the cylinder wall. Furthermore, the provision of the chamfer at the upper edge portion of the upper sliding face reduces the amount of oil raked upwards by the piston during an upward movement thereof and inhibits oil loss.

Furthermore, in the first aspect of the present invention, a contact portion of the inner ring that contacts the coil expander may be provided with an upper inclined face extending radially inwards and upwards and a lower inclined face extending radially inwards and downwards. Besides, angles of inclination of the upper and lower inclined faces with respect to a plane where the coil expander is disposed can be set within a range from 30° to 60°.

Thus, the piston ring structural body, which has a construction wherein the outer ring continuously formed of polyimide without being provided with an abutment is pressed outwards in the radial direction of the piston by the coil expander via the inner ring formed of PTFE without being provided with an abutment, ensures that the tensile force of the coil expander is suitably distributed in the top-to-bottom direction and in the outward radial direction. Thereby, the sealability around the ring groove as well as the sealability between the outer ring and the cylinder wall can be satisfactorily achieved.

A second aspect of the present invention provides a method of mounting a piston ring structural body. This method includes first through fourth steps. In the first step, a coil expander is fitted into a piston ring groove. In the second step, a piston is covered from a top side thereof with a ring guide having a truncated cone portion that is enlarged toward a cylindrical portion adapted to an outer circumference of the piston, such that a lower end of the cylindrical portion is located close to a center of a land that is located immediately above the piston ring groove. In the third step, an inner ring continuously formed of a second resinous material without being provided with an abutment is fitted into the piston ring groove, using the truncated cone portion of the ring guide. In the fourth step, an outer ring continuously formed of a first resinous material without being provided with an abutment is fitted into the piston ring groove, using the truncated cone portion of the ring guide, in a state where the inner ring thus-fitted into the piston ring groove and pressed outwards by the coil expander is pressed radially inwards by an inner ring pressing jig so as to prevent an outermost portion of the inner ring from projecting from the piston ring groove.

This mounting method makes it possible to fit the piston ring structural body, which has a construction wherein the outer ring continuously formed of polyimide without being provided with an abutment is pressed outwards in the radial direction of the piston by the coil expander via the inner ring continuously formed of PTFE without being provided with an abutment, into the ring groove easily and reliably.

In the second aspect of the present invention, the inner ring pressing jig may be provided with a pressing portion for pressing the inner ring radially inwards and a fit portion that is fitted into another ring groove to be positioned therein.

The thus-constructed method of mounting the piston ring structural body ensures that the inner ring pressing jig forces the inner ring into the ring groove easily and reliably, whereby the overall workability is improved.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF THE PREFERRED EMBODIMENT

An embodiment of the present invention will be described hereinafter with reference to the accompanying drawings.

Figure 1:
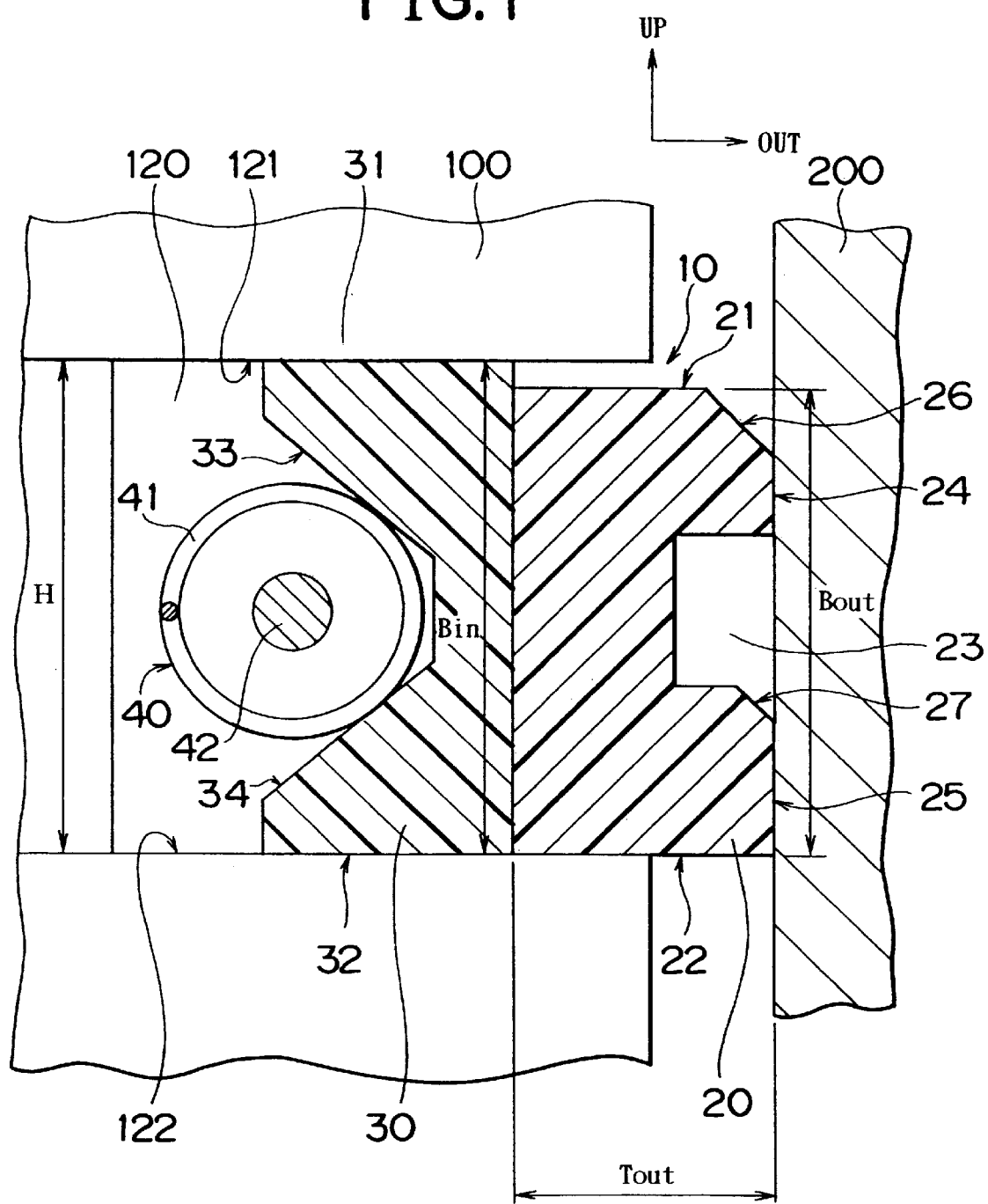
FIG. 1 shows a piston ring structural body according to one embodiment of the present invention.

FIG. 1 shows a piston ring structural body according to an embodiment of the present invention, used as a second ring of a piston.

Referring to FIG. 1, a ring groove 120 is formed in a piston 100, which slides against a cylinder wall 200. The ring groove 120 is a second ring groove, which is located at the second closest position to a top portion (not shown) of the piston 100.

A piston ring structural body, which is entirely denoted by reference numeral 10, is fitted into the ring groove 120. The piston ring structural body 10 is composed of an outer ring 20, an inner ring 30 and a coil expander 40, which are arranged in that order in a radially outside-to-inside direction. Both the outer ring 20 and the inner ring 30 are continuously formed with being provided with an abutment. It is to be noted in FIG. 1 that arrow UP indicates an upward direction of the piston 100 and that arrow OUT indicates a radially outward direction of the piston 100.

The outer ring 20 is made of polyimide and has a coefficient of thermal expansion of $3 \times 10^{-5}$/K or less and a breaking point (a ratio of an elongation of a test piece that has been fracture to the original length thereof in a tensile test) of 10% (10% of the original length) or more.

In a free state where the outer ring 20 is not fitted into the ring groove 120, the height $B_{out}$ of the outer ring 20 in a piston-axis direction is set smaller than the height H of the ring groove 120. Even when the outer ring 20 is fitted into the ring groove 120 during operation of an engine, the height $B_{out}$ of the outer ring 20 is smaller than the height H of the ring groove 120 because of the small coefficient of thermal expansion as mentioned above. FIG. 1 shows that the piston 100 is in the process of moving from a bottom dead center position to a top dead center position during operation of the engine. In this state, a lower face 22 of the outer ring 20 is pressed against a bottom face 122 of the ring groove 120. When the piston 100 moves from the top dead center position to the bottom dead center position, the outer ring 20 moves upwards within the ring groove 120, so that an upper face 21 of the outer ring 20 is pressed against a top face 121 of the ring groove 120.

A radially outside sliding face of the outer ring 20, which slides on the cylinder wall 200, is provided with a groove 23 continuously extending in the outer circumferential direction. The sliding face is thereby divided into upper and lower sliding faces 24, 25. By thus dividing the sliding face into the upper and lower sliding faces 24, 25, the outer ring 20 can slide against the cylinder wall 200 in a stable manner, despite a relatively small radial width $T_{out}$ thereof.

Upper edge portions of the upper and lower sliding faces 24, 25 are provided with chamfers 26, 27 respectively. The provision of the chamfers 26, 27 reduces the amount of oil film raked by the piston 100 during an upward movement thereof and inhibits the oil that has entered a space above the outer ring 20 from being consumed by burning together with fuel (what is called oil loss).

As shown in FIG. 1, the groove 23 of the outer ring 20 is formed at a location higher than the axial thickness center of the outer ring 20 by a predetermined distance (on the side of the combustion chamber when mounting the piston). The chamfer 26 formed at the upper end of the upper sliding face 24 is larger than the chamfer 27 formed at the upper end of the lower sliding face 25. Owing to such a construction, when the piston slides within the cylinder towards the combustion chamber, the large chamfer 26 of the upper sliding face 24 appropriately rakes oil on the cylinder wall surface so as to form a homogeneous oil film, and the chamfer of the lower sliding face 25 is designed to maintain the thus-formed oil film without causing disorder thereto. Consequently, the oil film can be stabilized within the cylinder. Furthermore, since the upper sliding face 24 has a smaller sliding area than the lower sliding face 25, the areal pressure applied to the upper sliding face 24 by the pressing force of the coil expander is higher than that applied to the lower sliding face 25. However, oil generates a dynamic pressure when flowing onto the sliding face, whereby it becomes possible to prevent the upper sliding face 24 from being abraded excessively. On the other hand, the lower sliding face 25 is wider than the upper sliding face 24 in the top-to-bottom direction, so that the outer ring 20 is well maintained in a stable posture. Therefore, it is possible to inhibit a deterioration in sealability, which is ascribed to an inclination of the outer ring 20 within the ring groove 120.

The outer ring 20 is entirely coated with diamond-like carbon (DLC) (amorphous carbon made up of tetrahedral bond like diamond, having the Vickers hardness ranging from 2000 to 3500 and having high corrosion resistance), which reduces abrasion resulting from sliding movement of the upper and lower sliding faces 24, 25 against the cylinder wall 200 as well as abrasion resulting from repetitive abutment of the upper and lower faces 21, 22 of the outer ring 20 on the top and bottom faces 121, 122 of the ring groove 120 respectively. Consequently, the overall durability is enhanced. Instead of DLC, titanium nitride (TiN) or chrome nitride (CrN) can also be used as a coating material.

The inner ring 30 is made of PTFE. The coefficient of thermal expansion and the breakingpoint of the inner ring 30 are larger than those of polyimide, which is a material of the aforementioned outer ring 20.

The inner ring 30 has on an inner diameter-side thereof an upper inclined face 33 extending inwards and upwards and a lower inclined face 34 extending inwards and downwards. The angles of inclination α, β of the respective inclined faces 33, 34 with respect to a ring center plane range from 30° to 60° and, more preferably, ranges from 40° to 50°. If those angles of inclination are above the aforementioned range, the inner ring 30 becomes unlikely to be deformed in a later described height direction, so that the sealing forces acting in piston-axis direction between the inner ring 30 and the top and bottom faces 121, 122 of the ring groove 120 respectively are insufficient. Conversely, if those angles of inclination are below the aforementioned range, the pressing forces acting in the piston-axis direction become too large, so that corresponding portions of the inner ring 30 are crushed. Consequently, the inner ring 30 becomes susceptible to permanent deformation and sealed portions deteriorate in terms of durability.

In a free state where the inner ring 30 is not fitted into the ring groove 120 at a room temperature, the height of the inner ring 30 in a piston-axis direction is set smaller than the height H of the ring groove 120 and substantially equal to the height $B_{out}$ of the outer ring 20.

However, when the inner ring 30 is fitted into the ring groove 120 during operation of the engine at a high temperature, it expands due to a large coefficient of thermal expansion thereof and becomes susceptible to deformation. In such a state, the inner ring 30 is pressed outwards due to a tensile force of the coil expander 40 via the aforementioned inclined faces. Thus, the height $B_{in}$ of the inner ring 30 in the aforementioned piston-axis direction increases and the upper and lower faces 31, 32 of the inner ring 30 come into close contact with the top and bottom faces 121, 122 of the ring groove 120 respectively. This ensures that the gas tending to flow along a wall surface of the ring groove 120 is reliably sealed.

Furthermore, because the inner ring 30 is susceptible to deformation, the coil expander 40 can effectively apply a tensile force to the outer ring 20 so as to press the outer ring 20 against the cylinder wall 200. Thereby, the sealability between the outer ring 20 and the cylinder wall 200 can be maintained.

The structure of the coil expander 40 will now be described. The coil expander 40 has a known structure wherein a steel coil 41, which is made by winding a steel wire of a circular cross-section like a coil, has a core member 42 passing therethrough and is bent into a circular shape along the core member 42. The steel coil 41 and the core member 42 are provided with abutment portions respectively. The coil expander 40 is disposed to be received between the aforementioned upper and lower inclined faces 33, 34 of the inner ring 30. By being thus received, the coil expander 40 becomes shorter. Accordingly, the coil expander 40 attempts to assume its free length and thereby generates such a force as to stretch out the inner ring 30.

A method of fitting the thus-constructed outer ring 20, inner ring 30 and coil expander 40 into the second ring groove, which is located at the second closest position to the top portion of the piston 100, will now be described.

In a first step, the coil expander 40 is fitted into the ring groove 120. This step is carried out such that abutment portions of the steel coil 41 and the core member 42 are made to coincide with each other in the circumferential direction and that the coil expander 40 is fitted into the ring groove 120 while simultaneously stretching out those abutment portions.

Then, the inner ring 30 is fitted into the ring groove. Because the inner diameter of the inner ring 30 is smaller than the outer diameter of the piston 100, it is necessary to fit the inner ring 30 into the ring groove while enlarging the diameter thereof.

Accordingly, as a second step, an operation of fitting a ring guide 300, which is a jig for fitting the inner ring 30 into the ring groove 120 while enlarging the inner ring 30, is carried out.

Figure 2:
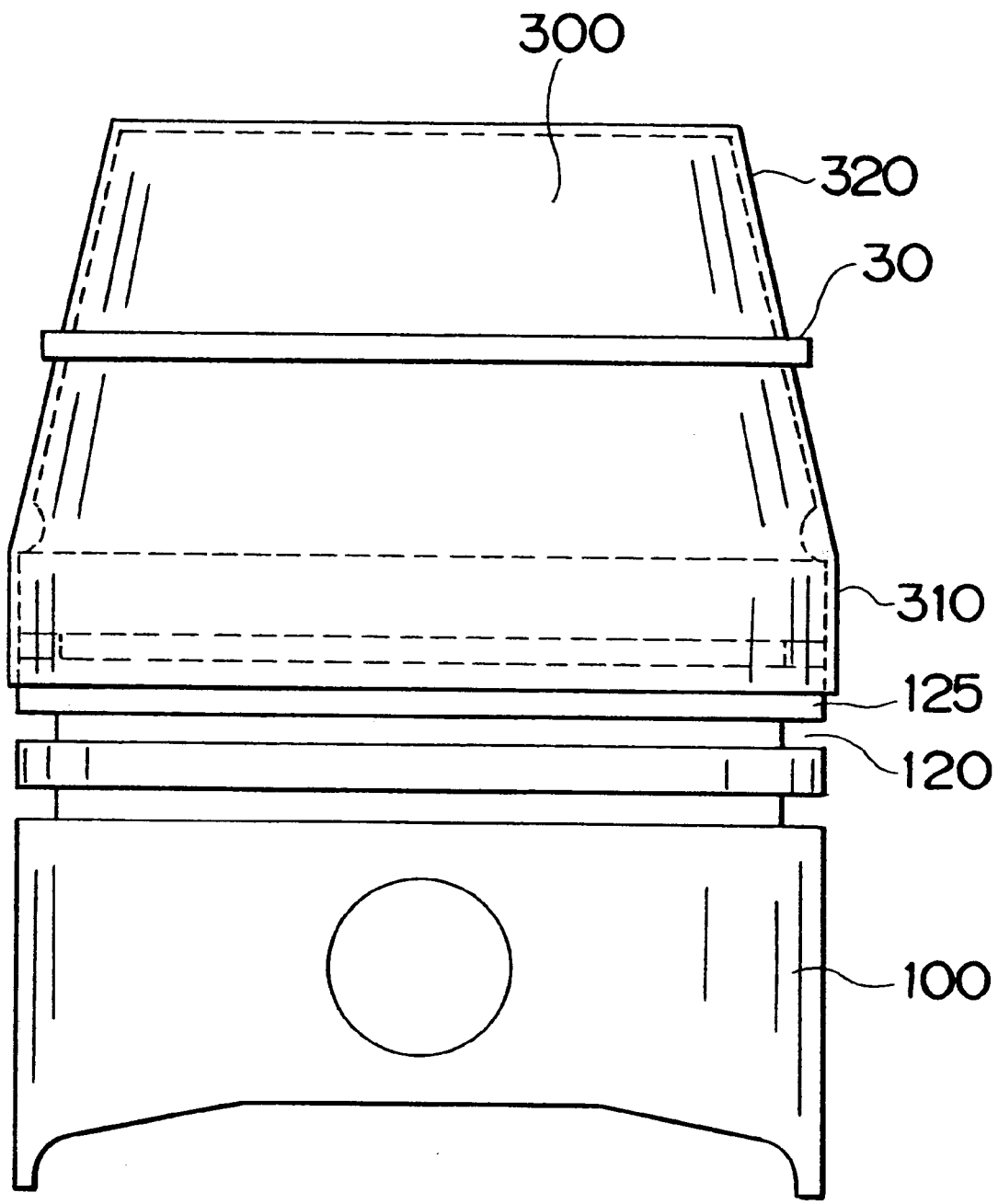
FIG. 2 shows the structure of a ring guide.

FIG. 2 shows a state where the ring guide 300 is attached to the piston 100. As shown in the drawing, the ring guide 300 is composed of a cylindrical portion 310 and a truncated cone portion 320. The cylindrical portion 310 has such an inner diameter that the cylindrical portion 310 can be fitted onto the outer periphery of the piston 100. The cylindrical portion 310 has such a depth that when covering the piston 100 from the top portion thereof, the lower end of the cylindrical portion 310 is located at the center of a second land 125, which is located immediately above the second ring groove 120 into which the inner ring 30 is fitted.

On the other hand, the top portion of the truncated cone portion 320 has such an outer diameter that the inner ring 30 is easily fitted onto the truncated cone portion 320. The outer diameter of the lower end portion of the truncated cone portion 320 is equal to that of the cylindrical portion 310.

The smaller the enlargement amount of the inner ring 30 is, the easier the fitting operation becomes. Thus, the thinner the ring guide 300 is, the better.

In a third step, the thus-fitted ring guide 300 is used to fit the inner ring 30 into the second ring groove.

Figure 3:
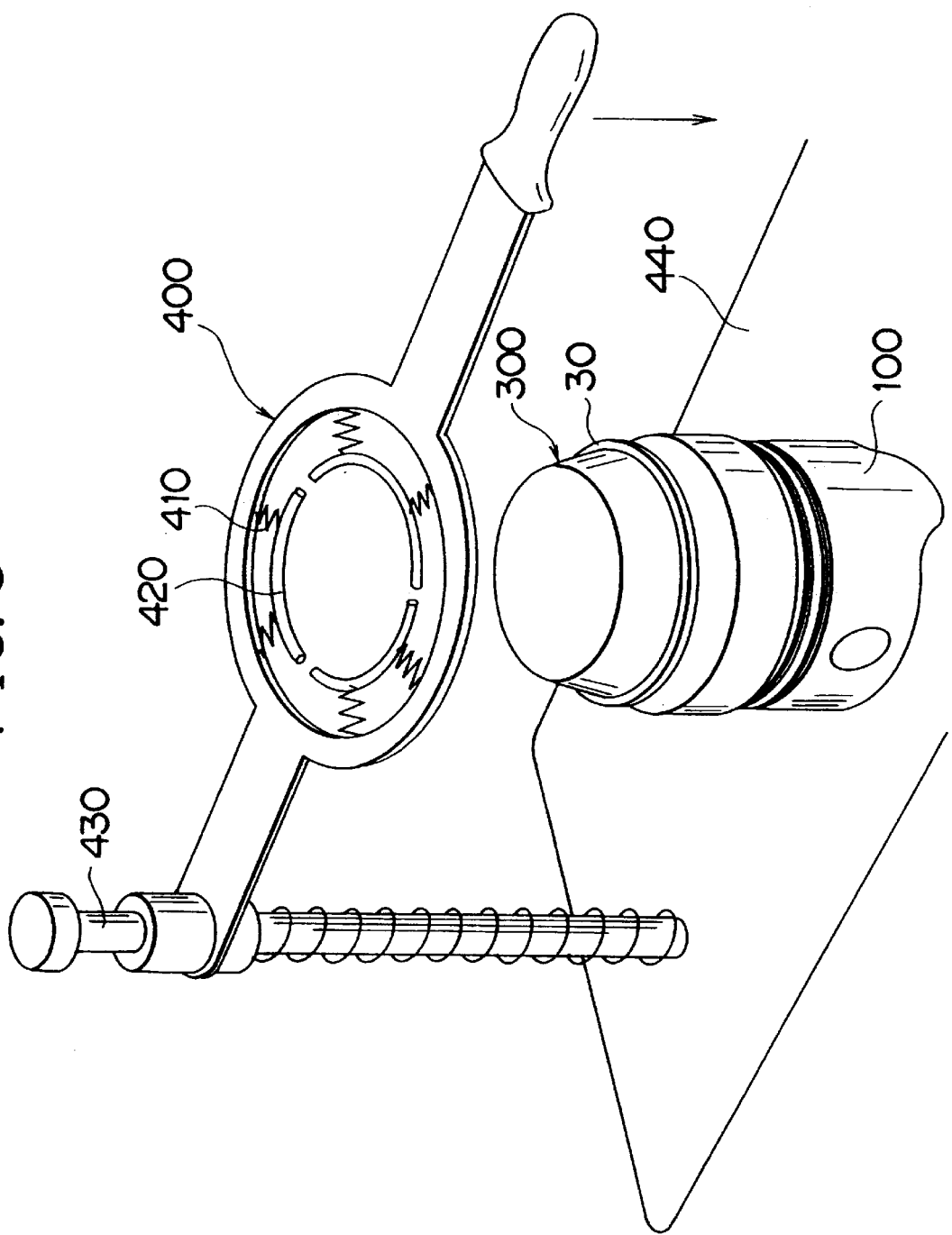
FIG. 3 shows the structure of a ring-forcing jig.

This step is carried out using, for example, a ring-forcing jig 400 as shown in FIG. 3. The ring-forcing jig 400 causes three radially movable ring pieces 420 that are suitably supported by springs 410 to reciprocate along a column 430. In a free state, the inner diameter of a circle composed of the three ring pieces 420 is larger than the outer diameter of the top portion of the truncated cone portion 320 of the ring guide 300, which is fitted onto the piston 100 that is suitably secured onto a work bench 440. When the inner ring 30 is forcibly fitted onto the ring guide 300, the inner ring 30 can be enlarged until the inner diameter thereof becomes equal to the outer diameter of the cylindrical portion 320 of the ring guide 300.

The ring-forcing jig shown in the drawing is merely an example. Any type of jig can be used as long as it can forcibly fit the inner ring onto the ring guide as described above.

In a fourth step, the outer ring 20 is fitted onto the thus-fitted inner ring 30.

The thus-fitted inner ring 30 is pressed outwards due to a tensile force of the coil expander 40, so that the inner ring 30 sticks out from the ring groove 120. Therefore, in the fourth step, the inner ring 30 is first forced inwards to ensure that it does not stick out from the ring groove 120, and the fitting operation of the outer ring 20 is then carried out.

Figure 4:
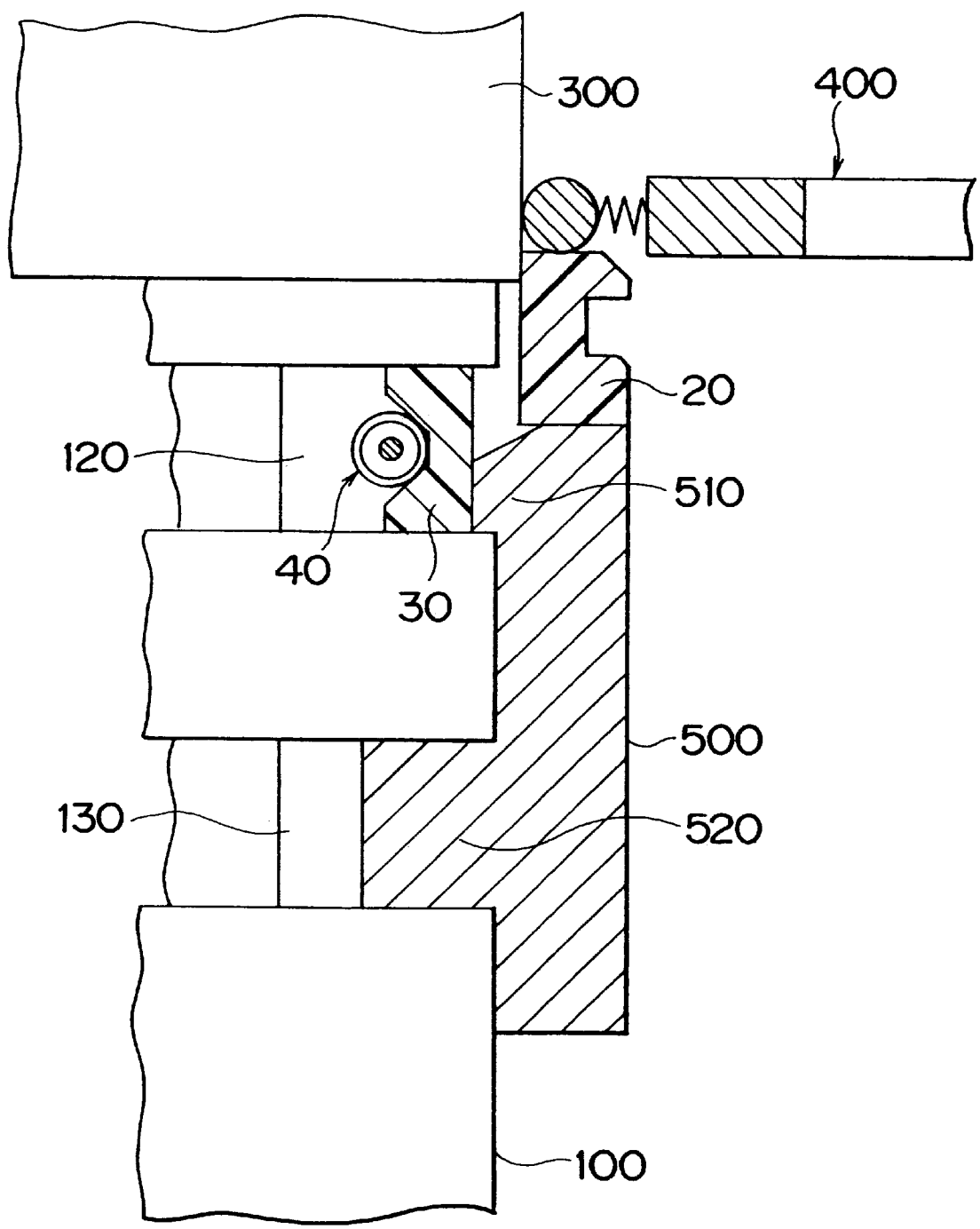
FIG. 4 shows the structure of an inner ring pressing jig.

FIG. 4 is a view from a direction perpendicular to the axis of the piston 100, showing how the inner ring 30 is pressed inwards. Referring to FIG. 4, an inner ring pressing jig 500 is divided into two portions when viewed from the piston-axis direction. The inner ring pressing jig 500 has an inner ring pressing portion 510 for pressing the inner ring 30 and a positioning portion 520 for positioning the inner ring pressing portion 510 at a predetermined position. The positioning portion 520 is tightly fitted into an oil ring groove 130, which is located below the second ring groove 120 into which the inner ring 30 is fitted. The inner ring pressing portion 510 presses the inner ring 30 inwards such that the outermost portion of the inner ring 30 is located inwardly of the outer circumference of the piston 100 when the positioning portion 520 is tightly fitted into the oil ring groove 130.

As described above, in a state where the inner ring 30 is pressed inwards beyond the outer circumference of the piston 100, the outer ring 20 is pressed downwards using the ring guide 300 and the ring-forcing jig 400. When the outer ring 20 comes into contact with an upper face 510 of the inner ring pressing jig 500, the inner ring pressing jig 500 is removed. Thereafter, the outer ring 20 is pressed further downwards using the ring-forcing jig 400 until the outer ring 20 is fitted onto the inner ring 30.

By carrying out the thus-described first through fourth steps, the piston ring structural body 10 can be fitted into the second ring groove 120 of the piston 100 easily and reliably. The piston ring structural body 10 has a construction wherein the outer ring 20 continuously formed of polyimide without being provided with an abutment is pressed radially outwards by the steel coil expander 40 via the inner ring 30 continuously formed of PTFE without being provided with an abutment.

According to the exemplary descriptions of the embodiment, the piston ring structural body is used as a second ring that is fitted into the second ring groove, which is located at the second closest position to the top portion of the piston. However, the piston ring structural body can also be used as a ring other than the second ring, for example, a sealing ring of the piston.

Because the inner ring of the aforementioned embodiment is more susceptible to deformation at a high temperature, the sealability around the ring groove is ensured and the coil expander can suitably apply a tensile force to the outer ring. The outer ring is unlikely to be deformed even at a high temperature, so that the outer ring smoothly slides on the cylinder wall surface without causing any damage to the sealability between itself and the cylinder wall surface. Accordingly, it is possible to obtain a piston ring structural body that resists well a possible deterioration of sealability, exhibits high durability and inhibits an increase in friction loss by reducing a pressing force applied to the cylinder wall due to a tensile force of the coil expander.

Furthermore, the aforementioned mounting method makes it possible to fit the piston ring structural body into the piston ring groove easily and reliably.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A piston ring structural body fitted into a ring groove of a piston, comprising:
   an outer ring continuously formed of a first resinous material without being provided with a gap;
   an inner ring continuously formed of a second resinous material without being provided with a gap, wherein the inner ring does not contact an upper or lower surface of the outer ring; and
   a ring tensile force applying member for pressing said outer ring outwards in a radial direction of the piston via said inner ring,
   wherein said first resinous material has a coefficient of thermal expansion and a breaking point that are lower than those of said second resinous material.

2. The piston ring structural body according to claim 1, wherein the ring tensile force applying member is a coil expander, which is a member composed of a metal wire wound like a coil.

3. The piston ring structural body according to claim 1, wherein said first resinous material is polyimide and said second resinous material is polytetrafluoroethylene.

4. The piston ring structural body according to claim 3, wherein at least a lower face of said outer ring is coated with any one of titanium nitride, chrome nitride and diamond-like carbon.

5. The piston ring structural body according to claim 3, wherein at least an outer sliding face of said outer ring that is in sliding contact with a cylinder wall is coated with one of titanium nitride, chrome nitride and diamond-like carbon.

6. The piston ring structural body according to claim 1, wherein said piston ring structural body is a second ring fitted into a ring groove that is located at the second closest position to a top portion of the piston.

7. The piston ring structural body according to claim 1,
wherein an outside sliding face of the outer ring that is in sliding contact with a cylinder wall is divided in a top-to-bottom direction, and
wherein at least an upper edge of an uppermost sliding face is provided with a chamfer.

8. The piston ring structural body according to claim 7,
wherein sliding faces, which are formed by dividing the outer sliding face of said outer ring, are provided with chamfers at respective upper edges thereof, said chamfers being different in size.

9. The piston ring structural body according to claim 7,
wherein the lower sliding face, which is formed by dividing the outer sliding face of said outer ring, is provided with a chamfer at an upper edge thereof,
wherein the chamfer of said upper sliding face is larger than the chamfer of said lower sliding face, and
wherein said upper sliding face is narrower than said lower sliding face in the top-to-bottom direction.

10. The piston ring structural body according to claim 1, wherein a contact portion of the inner ring that contacts the ring tensile force applying member is provided with an upper inclined face extending radially inwards and upwards and a lower inclined face extending radially inwards and downwards.

11. The piston ring structural body according to claim 10, wherein angles of inclination of said upper and lower inclined faces, with respect to a plane where the coil expander is disposed, are within the range of 30° to 60°.

12. The piston ring structure body according to claim 11, wherein angles of inclination of said upper and lower inclined faces, with respect to a plane where the coil expander is disposed, are within the range of 40° to 50°.

13. A method of mounting the piston ring structural body according to claim 1, comprising the steps of:
fitting the ring tensile force applying member into the piston ring groove;
covering the piston from a top side thereof with a ring guide having a truncated cone portion that is enlarged toward a cylindrical portion adapted to an outer circumference of the piston, such that a lower end of the cylindrical portion is located close to a center of a land that is located immediately above said piston ring groove;
fitting the inner ring continuously formed of a second resinous material without being provided with a gap into the piston ring groove, using the truncated cone portion of said ring guide; and
fitting the outer ring continuously formed of a first resinous material without being provided with a gap into the piston ring groove, using the truncated cone portion of said ring guide, in a state where the inner ring thus-fitted into the piston ring groove and pressed outwards by the ring tensile force applying member is pressed radially inwards by an inner ring pressing jig so as to prevent an outermost portion of the inner ring from projecting from the piston ring groove.

14. The method according to claim 13, wherein said inner ring pressing jig defines a pressing portion for pressing the inner ring radially inwards and a fit portion that is fitted into another ring groove to be positioned therein.

* * * * *